(12) United States Patent
Gibbs

(10) Patent No.: US 10,774,926 B2
(45) Date of Patent: Sep. 15, 2020

(54) GEARBOX FOR ELECTRIC ASSISTED STEERING APPARATUS

(71) Applicant: TRW Limited, Solihull, West Midlands (GB)

(72) Inventor: Paul David Gibbs, Burntwood Green (GB)

(73) Assignee: ZF Automotive UK Limited, Solihull, West Midlands ( * ) Notice: Subject to any disclaimer, the term of this patent is extended or adjusted under 35 U.S.C. 154(b) by 0 days.

(21) Appl. No.: 15/551,989

(22) PCT Filed: Feb. 17, 2016

(86) PCT No.: PCT/GB2016/050396
§ 371 (c)(1),
(2) Date: Aug. 18, 2017

(87) PCT Pub. No.: WO2016/132126
PCT Pub. Date: Aug. 25, 2016

(65) Prior Publication Data
US 2018/0073627 A1  Mar. 15, 2018

(30) Foreign Application Priority Data
Feb. 19, 2015  (GB) .................................. 1502825.1

(51) Int. Cl.
*F16H 57/12* (2006.01)
*B62D 5/04* (2006.01)
(Continued)

(52) U.S. Cl.
CPC ........... *F16H 57/12* (2013.01); *B62D 5/0409* (2013.01); *B62D 5/0454* (2013.01); *F16H 1/16* (2013.01);
(Continued)

(58) Field of Classification Search
CPC ........ F16H 1/16; F16H 3/06; F16H 2025/209; F16H 2057/126; F16H 2057/127;
(Continued)

(56) References Cited

U.S. PATENT DOCUMENTS 2,335,606 A * 11/1943 Pelphrey ................... F16H 1/16
74/396
3,429,201 A *  2/1969 Zucchellini ............... B23Q 5/46
475/7
(Continued)

FOREIGN PATENT DOCUMENTS

CN     1633375 A    6/2005
CN     1738983 A    2/2006
(Continued)

OTHER PUBLICATIONS

Patent Act 1977: Search Report under Section 17(5), Application No. GB1502825.1, dated Jul. 22, 2015.
(Continued)

*Primary Examiner* — Bobby Rushing, Jr.
(74) *Attorney, Agent, or Firm* — MacMillian, Sobanski & Todd, LLC

(57) ABSTRACT

A gearbox for use in an electric power assisted steering system of the kind in which a motor is connected to a portion of a steering mechanism through the gearbox, comprises a housing, a worm gear carried by a worm shaft and a gear wheel carried by an output shaft, the worm shaft being supported relative to the housing by a tail bearing assembly, in which the bearing assembly is located relative to the gearbox housing by a bearing carrier, the carrier comprising a bearing carrier part which is fixed to the bearing assembly and a reaction part which is fixed to the gearbox housing, the bearing carrier part being connected to the reaction part by at least two connecting elements, the two elements being spaced apart so that they act, in effect, with the bearing (Continued)

carrier part and the reaction part to form a parallelogram linkage that enables the bearing carrier to be relatively free to move relative to the reaction part in one direction whilst being relatively restrained from movement in the two directions orthogonal to that direction.

16 Claims, 8 Drawing Sheets

(51) Int. Cl.
    *F16H 55/24*     (2006.01)
    *F16H 1/16*     (2006.01)
    *F16H 57/039*     (2012.01)
    *F16H 57/021*     (2012.01)
    *F16H 57/022*     (2012.01)

(52) U.S. Cl.
    CPC ............ *F16H 55/24* (2013.01); *F16H 57/039* (2013.01); *F16H 2057/0213* (2013.01); *F16H 2057/0222* (2013.01)

(58) Field of Classification Search
    CPC ............. F16H 2057/0213; F16H 55/24; B62D 5/0454; B62D 5/0403
    See application file for complete search history.

(56) References Cited

U.S. PATENT DOCUMENTS

| | | | | |
|---|---|---|---|---|
| 6,357,313 | B1 * | 3/2002 | Appleyard | B62D 5/0409 74/388 PS |
| 6,398,400 | B1 * | 6/2002 | Nienhaus | F16C 23/10 384/255 |
| 6,550,567 | B2 * | 4/2003 | Murakami | B62D 5/0409 180/444 |
| 7,721,616 | B2 * | 5/2010 | Augustine | F16H 1/16 74/352 |
| 8,567,553 | B2 * | 10/2013 | Hamakita | B62D 5/0409 180/443 |
| 8,684,127 | B2 * | 4/2014 | Hama | B62D 5/0409 180/444 |
| 8,950,280 | B2 * | 2/2015 | Lescorail | F16H 57/022 384/255 |
| 9,051,003 | B2 * | 6/2015 | Galehr | B62D 5/0409 |
| 2004/0163879 | A1 | 8/2004 | Segawa | |
| 2006/0169528 | A1 | 8/2006 | Yuasa et al. | |
| 2009/0294202 | A1 * | 12/2009 | Choi | B62D 5/0409 180/425 |
| 2010/0116582 | A1 * | 5/2010 | Rho | B62D 5/0409 180/444 |
| 2010/0243367 | A1 | 9/2010 | Suzuki et al. | |
| 2012/0217085 | A1 * | 8/2012 | Sekikawa | B62D 5/0409 180/444 |
| 2015/0075899 | A1 * | 3/2015 | Kikuchi | B62D 5/0409 180/444 |
| 2015/0266506 | A1 * | 9/2015 | Sato | B62D 5/0421 180/444 |
| 2016/0201760 | A1 * | 7/2016 | Kwon | F16H 1/16 74/409 |

FOREIGN PATENT DOCUMENTS

| | | | | |
|---|---|---|---|---|
| DE | 102017219395 A1 * | 5/2019 | | B62D 5/0409 |
| EP | 0943842 A1 | 9/1999 | | |
| EP | 1087883 A1 | 4/2001 | | |
| EP | 1679447 A1 * | 7/2006 | | F16C 27/04 |
| EP | 2492167 A1 | 8/2012 | | |
| JP | H1068995 A | 3/1998 | | |
| JP | 2003166602 A | 6/2003 | | |
| JP | 2005256930 A | 9/2005 | | |
| JP | 200644449 A | 2/2006 | | |
| JP | 2013184502 A | 9/2013 | | |
| KR | 20110025256 A * | 3/2011 | | F16B 19/02 |
| WO | 99/65758 A1 | 12/1999 | | |
| WO | WO-2007144618 A1 * | 12/2007 | | B62D 5/0409 |

OTHER PUBLICATIONS

PCT International Search Report and the Written Opinion, Application No. PCT/GB2016/050396 filed Feb. 17, 2016, dated Apr. 26, 2016.

First Chinese Office Action, Application No. 201680018725.0, dated Mar. 25, 2019.

* cited by examiner

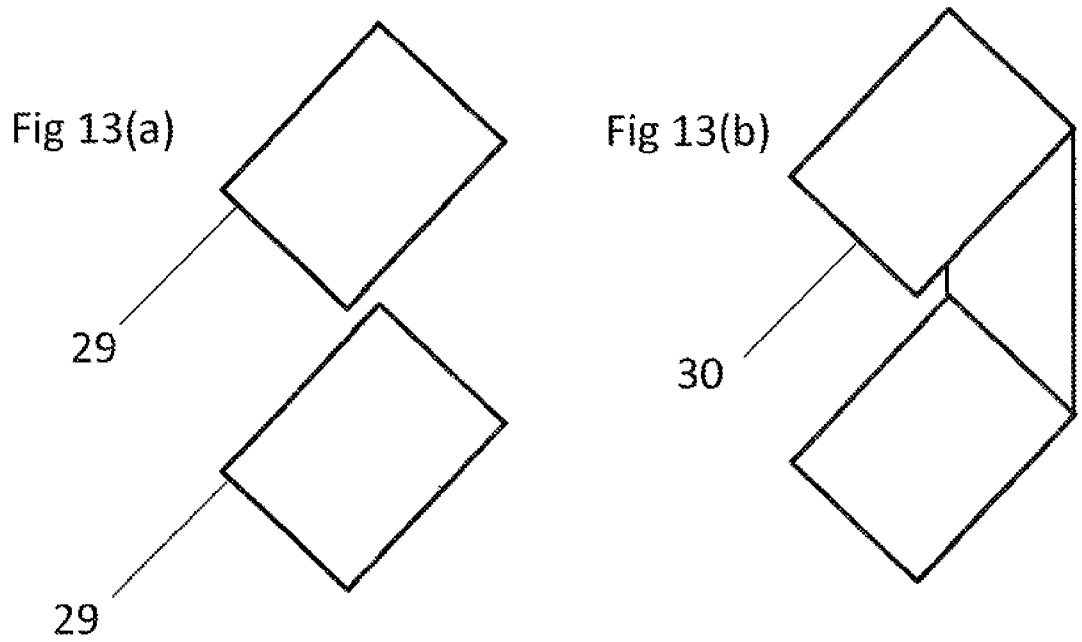

GEARBOX FOR ELECTRIC ASSISTED STEERING APPARATUS

CROSS-REFERENCE TO RELATED APPLICATIONS

This application is a national stage of International Application No. PCT/GB2016/050396, filed 17 Feb. 2016, the disclosures of which are incorporated herein by reference in entirety, and which claimed priority to Great Britain Patent Application No. 1502825.1, filed 19 Feb. 2015, the disclosures of which are incorporated herein by reference in entirety.

BACKGROUND OF THE INVENTION

This invention relates to improvements in electric power assisted steering apparatus and in particular to gearbox assemblies for use in electric power assisted steering systems of the kind which incorporate a worm and wheel gear assembly for transferring torque from an electric motor to a steering shaft or output shaft operatively connected thereto.

It is known to provide a power steering system for a vehicle comprising an electric motor having a stator and a rotor, an input shaft operatively connected to the rotor and adapted to rotate therewith, an output shaft associated with a steering shaft, and a gearbox adapted to transfer torque from the input shaft to the output shaft in response to a measure of the torque in the output shaft as produced by a torque sensor. The motor is typically operated to apply an increasing torque to the output shaft as the measured torque increases, thus applying assistance that helps reduce the effort needed to steer the vehicle.

In a simple arrangement the input shaft carries a worm gear, and the output shaft carries a wheel gear. The teeth of the worm and wheel intermesh to transfer the torque. This system is simple and robust whilst providing relatively high gearing with a low component count. There exists, however, a problem in such gearboxes with noise and vibration due to incorrect meshing between the worm and wheel.

A worm and wheel gearbox, for an Electric Power Steering system, having a fixed centre distance between the axes of the worm and gear wheel is prone to rattle when transmitting zero or low torque if there is excessive clearance between the gear teeth of the worm and those of the gear wheel. Alternatively, it is prone to having high friction if there is forced meshing between the worm and wheel due to interference between the teeth.

A solution to this problem is taught in the applicant's earlier Patent EP 1 087 883 B 1. The document discloses a gearbox assembly that includes a pivoting means at or near to the centre of the wormshaft main bearing, which is at the motor end, in order to allow the wormshaft axis to rotate through small angles about its nominal position in the plane of the gearwheel, typically by less than plus/minus 0.5 degrees. The outer race of the tail bearing is biased towards the gearwheel by a spring with sufficient force to ensure that the worm teeth remain in dual-flank contact with the gear teeth for levels of gearbox output torque of zero to, typically, around 4 Nm. This removes backlash between the worm and gear teeth at low torques and thereby prevents rattle.

The outer race of the tail bearing is usually guided so that it can move only in the plane of the gear wheel. The guidance is provided by a component which is inserted into the gearbox housing and which has a short slot along which the outer race of the bearing can slide, usually by a maximum of around plus/minus 0.5 millimetres. The said guiding component, sometimes referred to as the "Oval Ring" has to be designed so that it itself does not become another source of rattle. It must therefore lightly grip the opposite sides of the tail bearing's outer race without causing enough friction to prevent its ability to slide fairly freely. It must, at the same time, prevent significant deflections of the bearing normal to the gear plane due to the effects of the gear tooth helix angle. These are generally conflicting requirements needing a highly non-linear type of lateral compliance to achieve satisfactory performance.

The oval ring may also incorporate a soft-stop which will prevent an audible impact when, at higher torques, the tail bearing is forced to one end of the slot by the gear tooth separation forces. Whilst that arrangement works well it can result in a small amount of unwanted lateral movement of the bearing together with too much frictional restriction of its movement along the slot.

BRIEF SUMMARY OF THE INVENTION

According to a first aspect there is provided a gearbox for use in an electric power assisted steering system of the kind in which a motor is connected to a portion of a steering mechanism through the gearbox, the gearbox comprising a housing, a worm gear carried by a worm shaft and a gear wheel carried by an output shaft, the worm shaft being supported relative to the housing by a tail bearing assembly, in which the bearing assembly is located relative to the gearbox housing by a bearing carrier, the carrier comprising a bearing carrier part which is fixed to the bearing assembly and a reaction part which is fixed to the gearbox housing, the bearing carrier part being connected to the reaction part by at least two connecting elements, the two elements being spaced apart so that they act, in effect, with the bearing carrier part and the reaction part to form a parallelogram linkage that enables the bearing carrier to be relatively free to move relative to the reaction part in one direction whilst being relatively restrained from movement in the two directions orthogonal to that direction.

The parallelogram linkage in which the two elements, bearing carrier and reaction part therefore form the four bars of the linkage, and this linkage enables the bearing carrier part and hence bearing assembly to translate in one direction F1 but not the other two orthogonal directions, in particular in a direction that is also orthogonal to the axis of the worm shaft F2. This provides control over the movement of the bearing assembly and hence movement of the worm shaft.

Each of the links may comprise a leaf spring with one end of the spring connected to the bearing carrier part and the other to the reaction part. Each leaf spring may comprise a generally flat, elongate part, the spring being relatively wide in the directions in which movement is to be restrained and relatively thin in the direction that it is allowed to deflect as part of the parralleogram.

Each leaf spring may comprise a steel leaf spring. Steel is a preferred material because it is relatively easy to work with, low cost, does not fatigue easily and is predictable. Other materials could be used, for instance composite leaf springs. The leaf springs may be parallel to the nominal axis of the worm shaft in one position of movement, and may be slightly at an angle to the nominal axis of the worm shaft in another position.

Where, for example, the worm shaft is directly above the gear wheel, each element of the linkage allows relatively free movement of the bearing assembly up and down, while restricting any side to side movement. Of course, as the bearing assembly is fixed to the bearing carrier the result is that the linkage controls the movement of the bearing assembly.

By leaf spring we mean a spring element that is fixed to the bearing carrier at one end and the reaction part at the other which is resilient so that it can bend when placed under a load.

A leaf spring achieves the desired deflection by bending, but in an alternative the elements may comprise rigid elements that are connected to the bearing carrier part and reaction part through pivots, rotation of which enable the linkage to move.

A combination of bending and pivoting may be provided, through use of suitable elements.

Each of the bearing carrier part and reaction part may be generally annular, having an inner diameter and an outer diameter, the two parts being offset along a common axis by a distance dependent on the length of the two leaf springs. The two annular parts may have a bore through which the worm shaft passes. As such each part may generally comprise a ring shaped member.

The bearing carrier part and reaction part may be spaced axially along the worm shaft so that each leaf spring also extends generally in a direction along the axis of the shaft to bridge the gap between the carrier part and reaction part.

The bearing assembly may be fixed to the bearing carrier part by locating at least part of the bearing assembly in an annular recess in the bearing carrier part. Likewise the reaction part may be fixed to the gearbox housing by locating it in a recess in the housing.

One of the two leaf springs may be located on a first side of the axis of the worm shaft and the other leaf spring may be located on the opposite side of the axis of the worm shaft.

The reaction part may be connected to the gearbox by locating it within a bore in the gearbox housing. The bore may be annular with the inner diameter of the bore approximately equal to the outer diameter of the reaction part. There may be an interference fit between the bore and outer diameter.

The tail bearing assembly may comprise a generally cylindrical inner race having a groove, a generally cylindrical outer race having a groove, and a plurality of ball bearings located between the inner and outer races.

There may be a clearance next to the bearing carrier part to allow movement of the bearing carrier part relative to the reaction part. Preferably, the force to deflect the bearing carrier part vertically relative to the reaction part should not exceed approximately 5 Newtons when the said deflection is approximately 0.5 mm. Note that the force acting on the tail bearing in the side to side direction may be in excess of 500 Newtons in shock load conditions. Therefore, the lateral stability of the leaf springs against buckling should be taken into account in the design. It is preferable that the leaf springs be formed from a spring grade steel.

The two elements may be attached to the bearing carrier part and/or to the reaction part by a process of over-moulding the parts onto the leaf springs. They may therefore be integral to the two parts once over-moulded.

The two elements may be connected together at one end to form a single U-shaped part in which the connecting part extends in a generally vertical plane and lies outboard of the end of the worm shaft. The connecting part may be rigid or may be able to bend to enable the elements to move as a parallel linkage.

The U shaped part may be conveniently achieved by each leaf spring being formed from a single wire bent into a U-shape. Alternatively, the pair of springs could be formed as a pair of U-shaped bent wires, each wire being in a vertical plane and separated by a distance similar to the width of the leaf springs.

In a refinement, the bearing carrier may comprise a pair of adjustment rings, wherein the reaction part may be mounted to the gearbox housing via the pair of adjustment rings which provide adjustment of the worm shaft's outward travel relative to the gear wheel axis. By outward travel we mean travel in the direction of movement of the parallel linkage where a parallel linkage is provided.

The adjustment rings may comprise a location ring and an adjuster ring in which the location ring in use is located within a recess in the gearbox housing and is shaped so that it can be located in at least two different angular orientations relative to the gearbox housing, the location ring having a bore defining an inner perimeter wall, the axis of the bore being located in a different plane dependent on which of the two positions it is in relative to the gearbox housing, and in which the adjuster ring in use is located within the bore of the location ring and is shaped so that it can be oriented in the bore in at least two different positions, the adjuster ring also including a bore which has an axis that is parallel to the axis of the bore in the location ring but offset from the axis by an amount dependent on which of the at least two positions it is in, and in which the adjuster ring supports the reaction part of the bearing carrier.

By providing two adjustment rings that can be set in at least two different positions each, the axis of the bore of each ring being in a different plane for each position, it is possible to orient the two rings in such a way that the axis of the bearing carrier can be adjusted.

Preferably the bore in the location ring is cylindrical, and/or the outer wall of the adjustment rings is also adjustable, enabling an infinite number of different angular positions and hence fine variation of the axis of the bearing carrier, to be achieved by rotation of the parts to the desired position during assembly.

For example, the inner bore of the location ring and the outer diameter of the adjuster ring may be concentric with an axis which is offset horizontally relative to the nominal axis of the worm shaft.

The two adjustment rings may therefore be arranged to provide for adjustment of the axis of the tail bearing in a radial direction towards/away from the wheel gear by rotation or otherwise altering their relative positions.

In one position, the outer diameter of the location ring may be concentric with the nominal worm shaft axis position, whereas the inner diameter of the location ring may be offset by a small dimension in a very small but substantially vertical displacement relative to the gearbox housing. The outside diameter of the adjustment ring may be similarly offset relative to its inside diameter, the inside diameter being concentric with the nominal worm shaft axis when in use.

When assembled with the relative angular orientation of the rings in a mid-adjustment position, the said two adjustment rings have their outer and inner diameters concentric. When inserted into the sub-assembled pair of rings, the reaction part is therefore concentric with the outer diameter of the location ring and hence concentric with the nominal worm axis. If, thereafter, the adjuster ring is rotated by a few degrees relative to the location ring, the location ring moves by a very small but substantially vertical displacement relative to the gearbox housing.

There may be a clearance between the bearing carrier part and the adjuster ring in all radial directions. This allows for the "sprung worm's" vertical movement to take place. To prevent noise, a cushioning element such as a soft rubber limit stop (so-called "soft stop") may be located between the outer diameter of the tail bearing an inner diameter of the Adjuster Ring which prevents impact noise when the worm shaft is forced away from the gear wheel at higher torques. Whilst rubber is convenient, it may be any elastomeric or other soft resilient material or any other small spring.

The adjuster ring may have a lever which the assembler can place a force upon to cause rotation of the adjuster ring relative to the location ring.

A ratchet device may be incorporated into the outer rim of the location ring and lever of the adjuster ring to facilitate the making and retention of any relative angular adjustment.

Whilst the adjustment rings have been described for use in combination with the carrier part/reaction part, the bearing assembly could be directly mounted to the adjustment rings and an alternative means of allowing some radial movement may be provided, such as the applicant's earlier oval bearing arrangement. We reserve the right to obtain separate protection for the feature of the adjustment rings.

Therefore in another aspect the invention provides a gearbox for use in an electric power assisted steering system of the kind in which a motor is connected to a portion of a steering mechanism through the gearbox, the gearbox comprising a housing, a worm gear carried by a worm shaft and a gear wheel carried by an output shaft, the worm shaft being supported relative to the housing by a tail bearing assembly, in which the bearing assembly is supported relative to the housing of the gearbox by a pair of adjustment rings which provide adjustment of the worm shaft's outward travel relative to the gear wheel axis by relative angular movement of the adjustment rings.

The adjustment rings may comprise a location ring and an adjuster ring in which the location ring in use is located within a recess in the gearbox housing and is shaped so that it can be located in at least two different angular orientations relative to the gearbox housing, the location ring having a bore defining an inner perimeter wall, the axis of the bore being located in a different plane dependent on which of the two positions it is in relative to the gearbox housing, and in which the adjuster ring in use is located within the bore of the location ring and is shaped so that it can be oriented in the bore in at least two different positions, the adjuster ring also including a bore which has an axis that is parallel to the axis of the bore in the location ring but offset from the axis by an amount dependent on which of the at least two positions it is in, and in which the adjuster ring supports the tail bearing assembly.

The bearing assembly may comprise a single race deep ball groove ball bearing.

The inner race and the outer race may be arranged about a common axis as is well known in the art of bearing manufacture.

The bearing housing may be located within a bore with one face engaging a step which may be defined by the base of the bore (where a blind bore is provided) to prevent it from moving axially.

According to a further aspect there is provided an electric power assisted steering system of the kind in which a motor is connected to a portion of a steering mechanism through a worm carried by a worm shaft and a wheel carried by an output shaft operatively coupled to the steering mechanism, the shaft being supported in a tail bearing assembly, in which the bearing assembly is located relative to the gearbox housing by a bearing carrier, the carrier comprising a bearing carrier part having a recess which is fixed to the bearing assembly and a reaction part which is mounted to the gearbox housing, the bearing carrier part being connected to the reaction part by at least two leaf springs to locate the tail bearing assembly, the two springs being spaced apart so that they act, in effect, as a parallelogram linkage to enable the bearing carrier to be relatively free to move relative to the reaction part in one direction whilst being relatively restrained from movement in the two planes orthogonal to that plane.

The bearing carrier may comprise a pair of adjustment rings, wherein the reaction part may be mounted to the gearbox housing via the pair of adjustment rings which provide adjustment of the worm shaft's outward travel relative to the gear wheel axis.

The adjustment rings may comprise a location ring and an adjuster ring in which the location ring in use is located within a recess in the gearbox housing and is shaped so that it can be located in at least two different angular orientations relative to the gearbox housing, the location ring having a bore defining an inner perimeter wall, the axis of the bore being located in a different plane dependent on which of the at least two positions it is in relative to the gearbox housing, and in which the adjuster ring in use is located within the bore of the location ring and is shaped so that it can be oriented in the bore in at least two different positions, the adjuster ring also including a bore which has an axis that is parallel to the axis of the bore in the location ring but offset from the axis by an amount dependent on which of the at least two positions it is in, and in which the adjuster ring supports the reaction part of the bearing carrier.

The second aspect of the invention may incorporate any of the features of the first aspect of the invention, further including the adjustment rings.

Other advantages of this invention will become apparent to those skilled in the art from the following detailed description of the preferred embodiments, when read in light of the accompanying drawings.

BRIEF DESCRIPTION OF THE DRAWINGS

FIG. 12(*b*) shows an adjuster ring with a ridged lever;

FIGS. 13 (a) and (b) show embodiments of various spring types for use in any of the embodiments of the present invention.

DETAILED DESCRIPTION OF THE INVENTION

Figure 1:
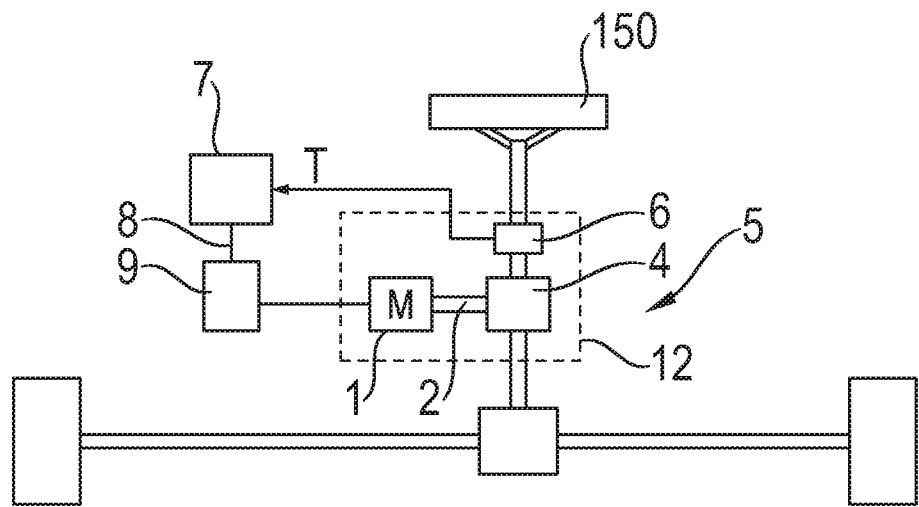
FIG. 1 is a schematic representation of the key mechanical components of an embodiment of an electric power assisted steering system.

A steering apparatus for a vehicle is shown in FIG. 1 of the accompanying drawings. The apparatus comprises an electric motor 1 which acts upon an input shaft 2 to a gearbox 4 of the worm and wheel type. The steering column 5 carries a torque sensor 6 that is adapted to measure the torque carried by the steering column 5. This torque is produced by the driver turning the steering wheel 150. The output signal T from this sensor 6 is fed to a signal processing means in the form of a digital signal processor 7. The signal processor 7 generates a motor drive signal indicative of the torque required from the motor 1, and this signal is applied to a motor drive circuit 9 through wires 8.

Figure 2:
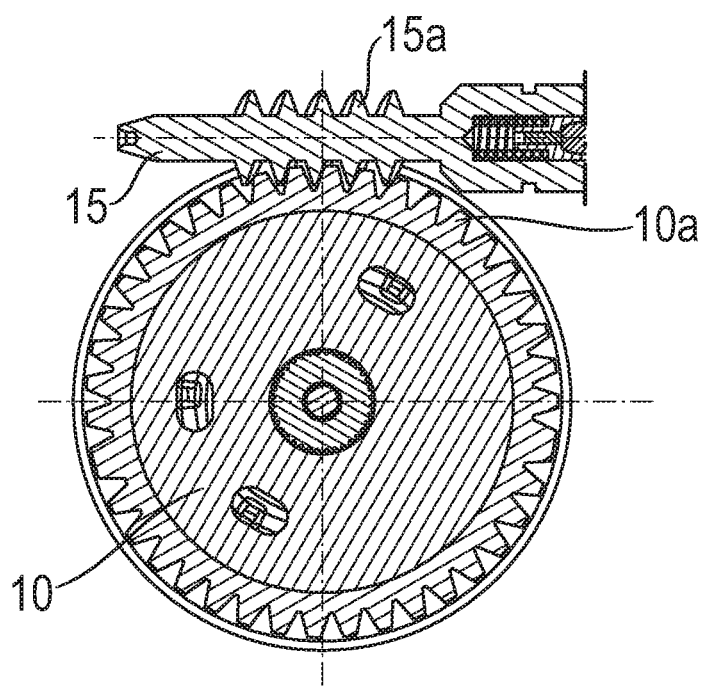
FIG. 2 is a first isometric representation of the main components of a worm and wheel gear used in the apparatus of FIG. 1 to transfer torque from an electric motor.
Figure 3:
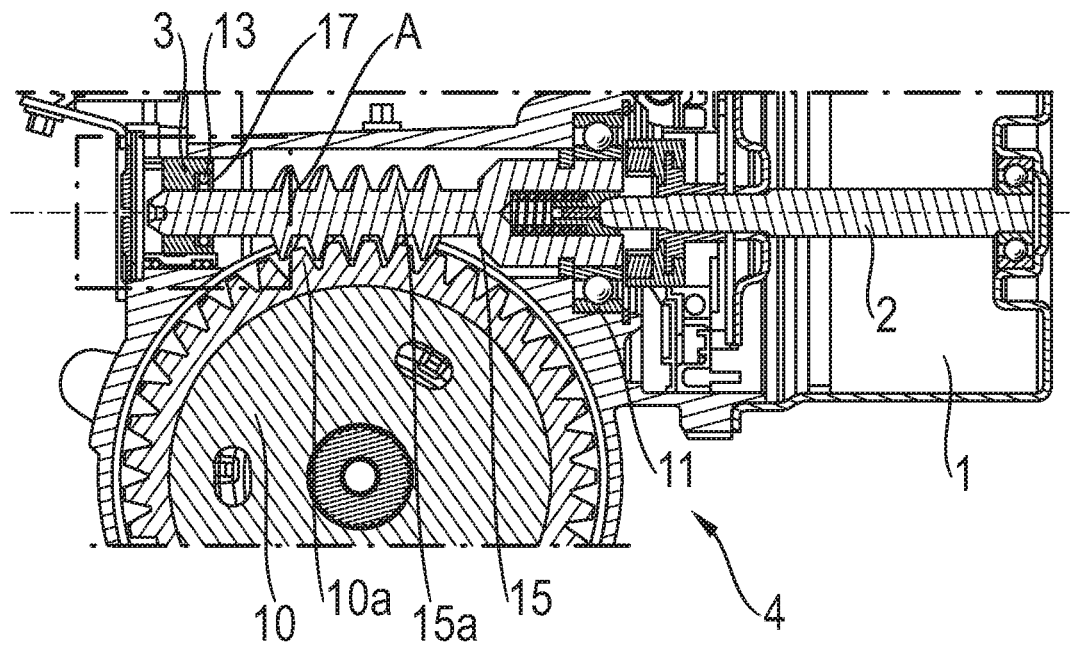
FIG. 3 is a perspective view of an embodiment of a gearbox of the type shown in FIG. 2.
Figure 4:
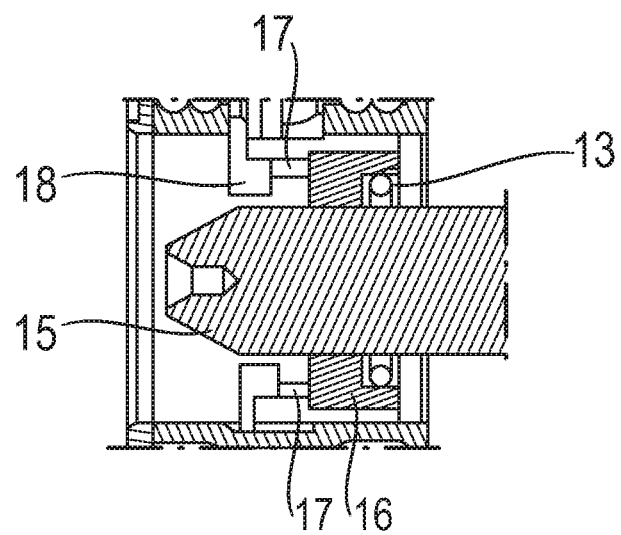
FIG. 4 is an enlarged view in part cut away of a first arrangement for locating the main bearing of the gearbox shown in section A of FIG. 3.

Components of the gearbox 4 are shown in more detail in FIGS. 2 and 3 of the accompanying drawings. FIG. 2 shows the worm shaft 15 and gear wheel 10, while FIG. 3 shows these components within an embodiment of the invention. The output shaft 2 of the motor 1 carries a worm shaft 15, and another output shaft (not shown) carries a gear wheel 10. The teeth 15a of the worm gear carried on the worm shaft 15 and teeth 10a of the wheel 10 intermesh to transfer the torque from the motor 1.

The gearbox 4 is provided with an adjustable shaft centre distance, with the worm gear 15a being pressed into mesh with the gear wheel 10 so that both sides (flanks) of the engaging teeth are in contact at least when zero or low torques are being transmitted.

The worm shaft 15 is secured at one end to the inner ring of a main ball bearing 11 whose outer ring is in turn supported in the gearbox housing (see 12 in FIG. 1) both axially and radially. The main ball bearing 11 provides sufficient angular freedom for the worm shaft 15 to be able to articulate (i.e. pivot about an axis parallel to the axis of the gear wheel 10) enough to cope with component tolerances, temperature changes and wear. As shown, the main bearing 11 is at the drive-end of the worm shaft 15, i.e. the end which is coupled to the motor 1.

On the opposite end (shown in box A), the worm shaft 15 is fitted to a bearing assembly 13, specifically a tail bearing assembly. The bearing 13 is only supported radially relative to the gearbox housing 12. The bearing 13 provides no axial control of the worm shaft 15. It is, however, constrained in one radial direction (side to side) but has a small amount of freedom to translate in the radial direction at right angles to that (up and down when the worm shaft 15 is directly above the wheel gear 10). The orientation of the said latter directions is such that the worm shaft 15 can pivot about the main bearing 11 and hence move in and out of the mesh of the gear wheel 10.

The required restrictions on radial movement of the tail bearing 13 in this embodiment is achieved by supporting the tail bearing 13 in a bearing carrier 3, comprising a bearing carrier part 16, two elements 17 and a reaction part 18, which is in turn fixed to the gearbox housing 12. The two elements, carrier part and reaction part together form the four sides of a four link parallel linkage. This controls movement of the bearing assembly in two directions F2 and F3. In this embodiment, the ball bearing is pressed onto the worm and does not need additional constraint in the F1 direction along the axis of the worm shaft.

Figure 5:
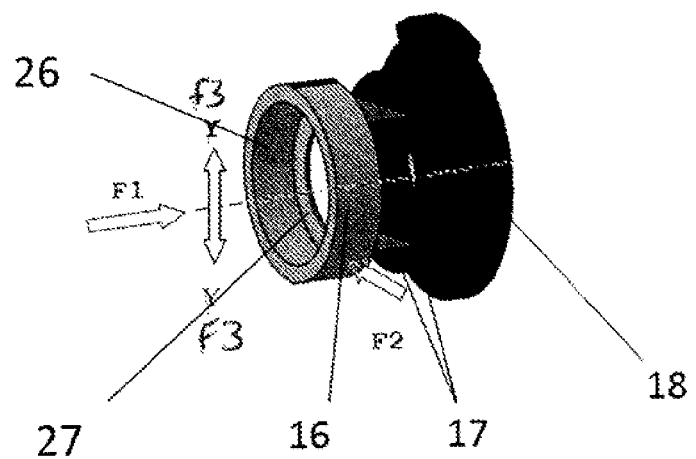
FIG. 5 is a view of the bearing carrier and reaction part of FIGS. 3 and 4 in addition to FIGS. 6 to 8.
Figure 6:
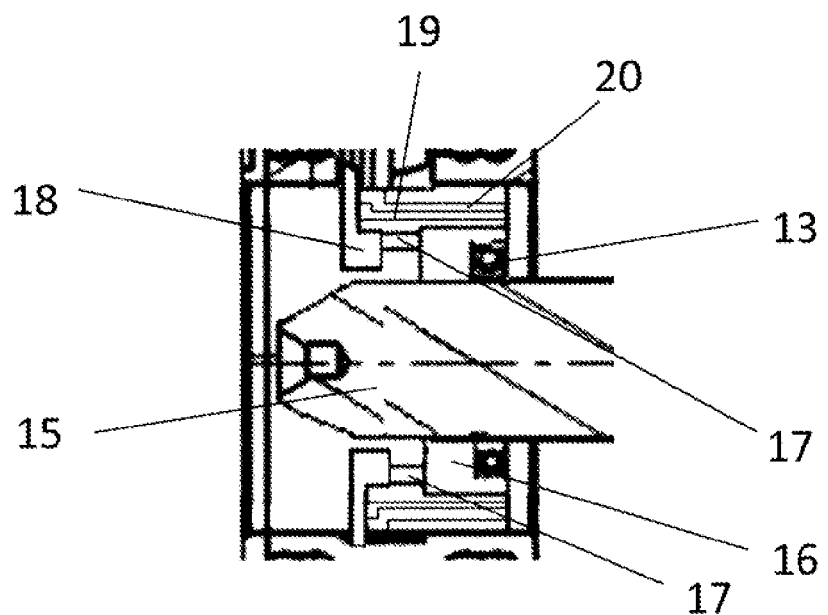
FIG. 6 is an embodiment of FIGS. 1 to 3 and is an alternative embodiment to the arrangement of FIG. 4.
Figure 7:
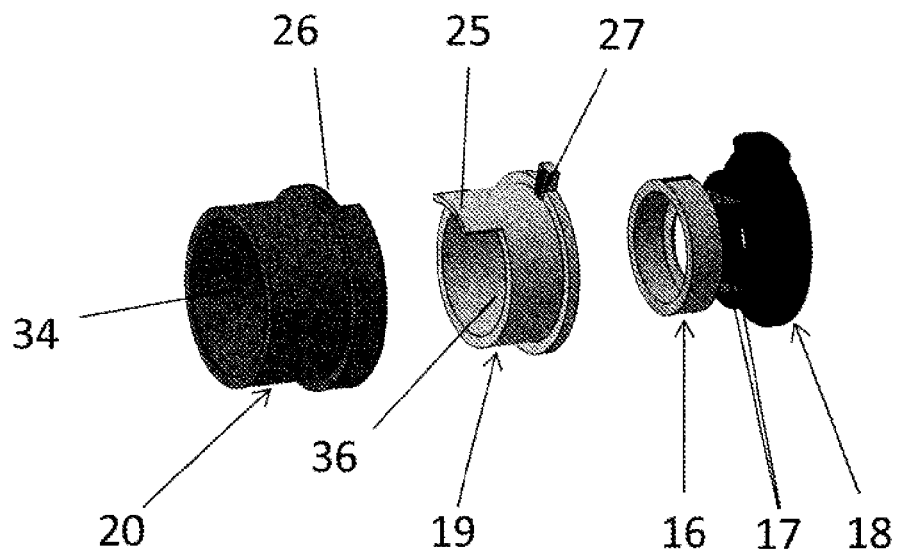
FIG. 7 shows an exploded view of the detailed view of the location ring, adjuster ring, bearing carrier and reaction part of the embodiment of FIGS. 5 and 6.
Figure 14A:
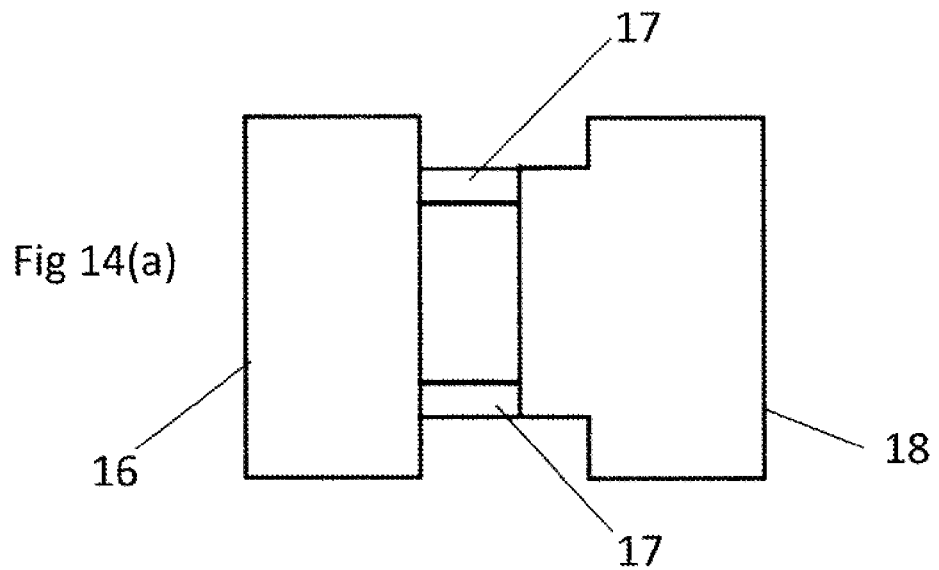
FIGS. 14(a)-(c) show the bearing carrier and reaction part in various positions of relative movement.
Figure 14B:
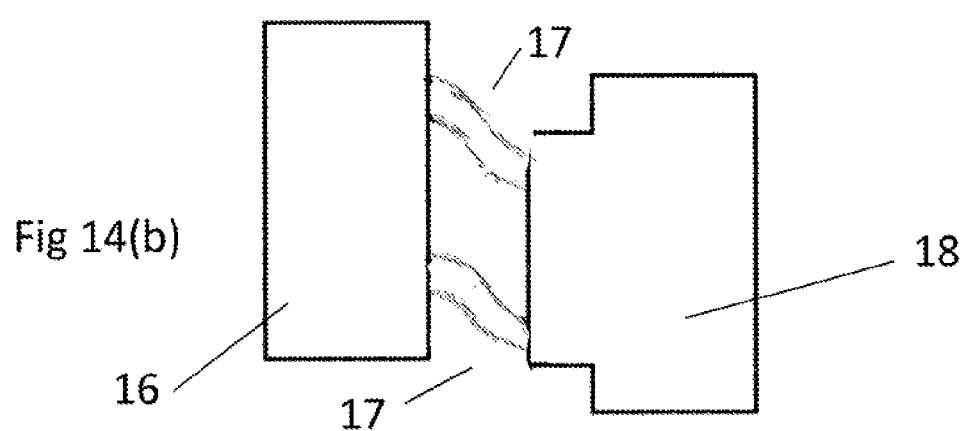
Figure 14C:
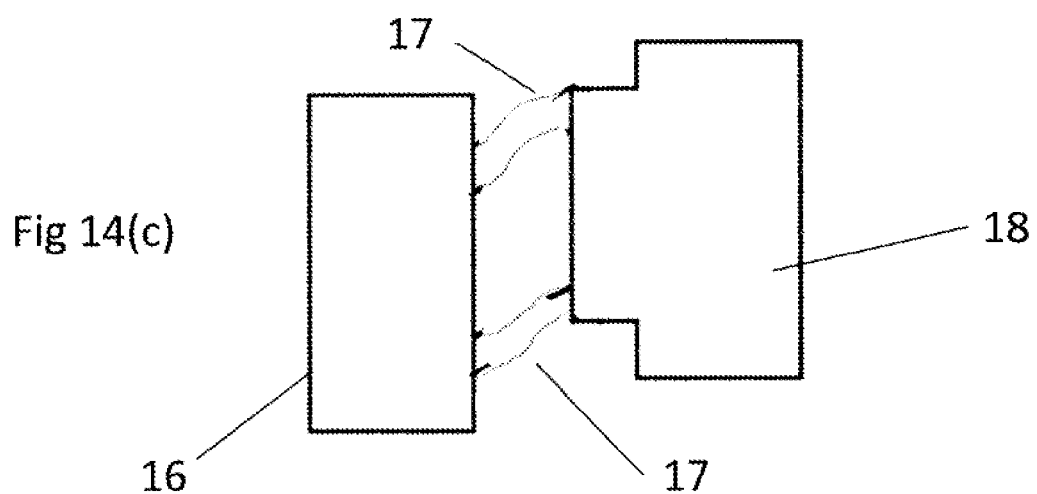

The two elements shown comprises parallel leaf springs 17 and these link the bearing carrier part 16 with at least a portion of the reaction part 18, which is rigidly mounted in the gearbox housing 12. The bearing carrier part is offset from the reaction part in the direction F1 along the axis of the worm shaft. As the reaction part 18 is rigidly mounted in the gearbox housing 12, it does not move relative to the gearbox housing 12. The bearing carrier part 16, connected to the reaction part 18 by springs, moves relative to the reaction part 18 into a clearance in the F3 direction along line Y-Y as shown in FIG. 5 when a force with a component in the Y-Y direction is placed upon the worm gear. This is because, the springs 17 are relatively rigid with respect to forces acting on the bearing 13 in the direction of the worm axis (F1) and in the direction of the gear wheel axis (F2) but are relatively flexible in the intended direction of free movement of the bearing (F3 along line Y-Y). Three stages of (Y-Y) parallelogram movement are shown in FIGS. 14(a) to (c). FIG. 14(a) shows the bearing carrier part 16 and reaction part 18 in a neutral position. FIG. 14(b) shows the bearing carrier 16 after moving up in the (Y-Y) direction have receiving a force in that direction and FIG. 14(c) shows (Y-Y) after moving down in the (Y-Y) direction after receiving a force in that direction.

The loads acting on the tail ball bearing 13 in the direction F1 are, in fact, close to zero provided that there is a small amount of axial movement allowed between the tail bearing 13 and its carrier 3. For instance, the tail bearing 13 may be a slide fit in the carrier 3 and/or may be mounted in an O-Ring in the bearing carrier 16 and/or be mounted to the worm shaft 15 via an O-Ring, the said O-Rings combining relatively high radial stiffness with relatively low axial stiffness, the rubber acting in shear in the latter case. Alternatively, this ball bearing 13 may be replaced by a needle or roller bearing. Note that there is a "main" ball bearing 11 at the motor 1 end of the worm whose functions include supporting the axial forces imposed on the worm shaft 15 by the gear wheel 10 (see FIG. 3).

In a second embodiment, shown in FIGS. 5 to 11, the tail bearing assembly 11, the bearing carrier 3 comprising bearing carrier part, springs 17 and reaction part 18 of the positioning assembly 3 operate in the same manner as the bearing carrier 16, springs 17 and reaction part 18 of the first embodiment. However the carrier 3 also comprises a pair of adjustment rings 19,20. The bearing carrier part 16 is mounted to the gearbox housing 12 via the adjustment rings 19, 20 which provide adjustment of the worm shaft's outward travel relative to the gear wheel axis i.e. the centre point about which it is able to move up and down in use in the case where the wheel 10 is directly above the worm shaft 15.

The adjustment rings comprise a location ring 20 and an adjuster ring 19. The location ring 20 in use is located within a recess in the gearbox housing 12 and is shaped so that it can be located in at least two different angular orientations relative to the gearbox housing 12. The location ring 20 has a bore 34 defining an inner perimeter wall 24 and the axis of the bore is located in a different plane dependent on which of the two positions it is in relative to the gearbox housing 12. The adjuster ring 19 in use is located within the bore 34 of the location ring 20 and is shaped so that it can be oriented in the bore 34 in at least two different positions. The adjuster ring 19 also includes a bore 36 which has an axis that is parallel to the axis of the bore 34 in the location ring 20 but offset from the axis by an amount dependent on which of the at least two positions it is in, and in which the adjuster ring 19 supports the reaction part 18 of the bearing carrier.

By providing two adjustment rings 19, 20 that can be set in at least two different positions each, the axis of the bore 34,36 of each ring 19, 20 is in a different plane for each position, it is possible to orient the two rings 19,20 in such a way that the axis of the bearing carrier can be adjusted.

Preferably the bore 34 in the location ring 20 is cylindrical as in the Figures, and/or the outer wall of the adjustment rings is also adjustable, enabling an infinite number of different angular positions and hence fine variation of the axis of the bearing carrier, to be achieved by rotation of the parts to the desired position during assembly.

The two adjustment rings 19, 20 are therefore arranged to provide for adjustment of the axis of the tail bearing 11 in a radial direction towards/away from the wheel gear 10 by rotation or otherwise altering their relative positions.

Figure 8:
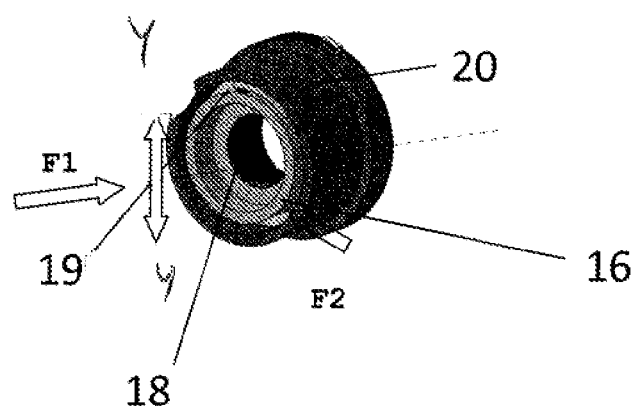
FIG. 8 shows assembled view of the components of FIG. 7.
Figure 9:
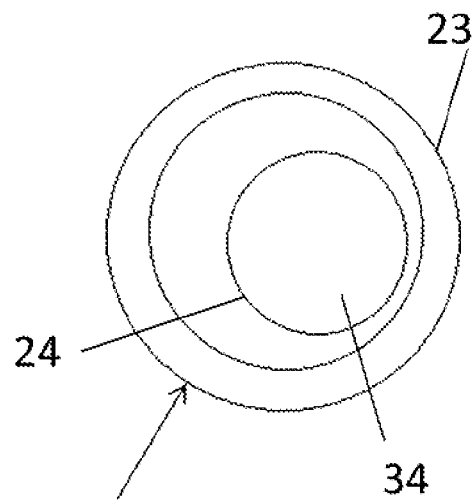
FIGS. 9 and 10 show the location ring of FIGS. 6 to 8 from slightly different angles.
Figure 10:
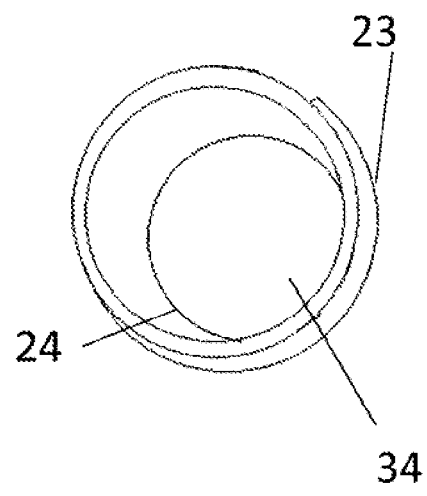
Figure 11:
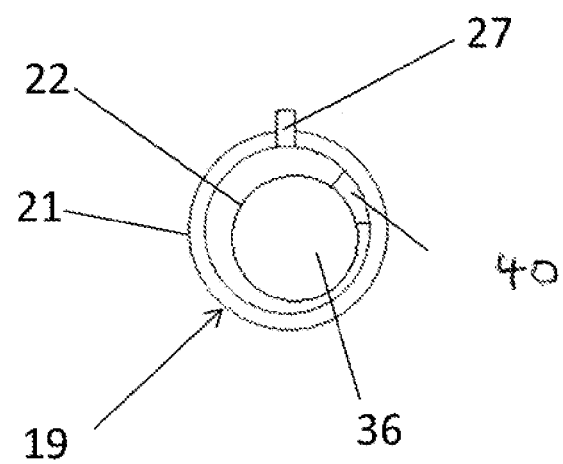
FIG. 11 shows the adjuster ring of FIGS. 6 to 8.

In one position, the outer diameter 23 of the location ring 20 is concentric with the nominal worm shaft 15 axis position, whereas its inner diameter 23 is offset by a small dimension in the direction of arrow F2 as shown in FIG. 8 (or in the direction opposite). The outside diameter 21 of the adjuster ring 19 is similarly offset relative to its inside diameter 22, the latter being concentric with the nominal worm shaft 15 axis.

When assembled with the relative angular orientation of the rings 19,20 in the mid-adjustment position, the adjustment rings 19,20 have concentric outer 23 and inner diameters 22. When inserted into the sub-assembled pair of rings as shown in FIG. 8, the reaction part 18 is therefore concentric with the outer diameter 23 of the location ring 20 and hence nominally concentric with the nominal worm axis. If, thereafter, the adjuster ring 19 is rotated by a few degrees (preferably by placing a force upon a lever 27 of the adjuster ring 19) relative to the location ring 20, the location ring 20 moves by a very small but substantially vertical displacement relative to the gearbox housing 12.

It should be noted that there is clearance between the bearing carrier 16 and the adjuster ring 19 in all radial directions. This allows for the "sprung worm's" vertical movement to take place. However, there is an optional rubber limit stop 40—(so-called "soft stop") incorporated into the outer diameter of the bearing carrier 16 which is centred on a vertical plane through the worm axis and which prevents impact noise when the worm shaft 15 is forced away from the gear wheel 10 at higher torques. An arcuate projection 25 from the adjuster ring 19 provides an abutment for the soft stop to act against. The said projection extends circumferentially by a sufficient angle to ensure that some part of it is aligned with the soft stop at every possible adjustment setting.

Figure 12A:
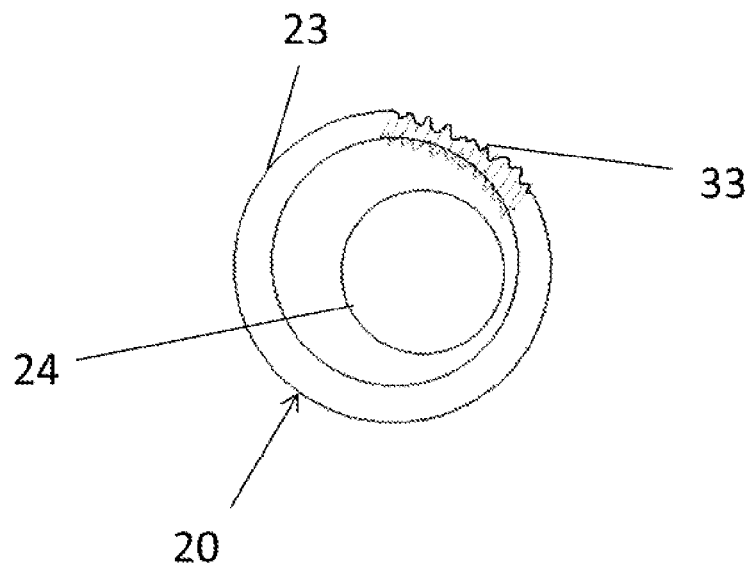
FIG. 12 (*a*) shows a location ring comprising a ridged section.
Figure 12B:
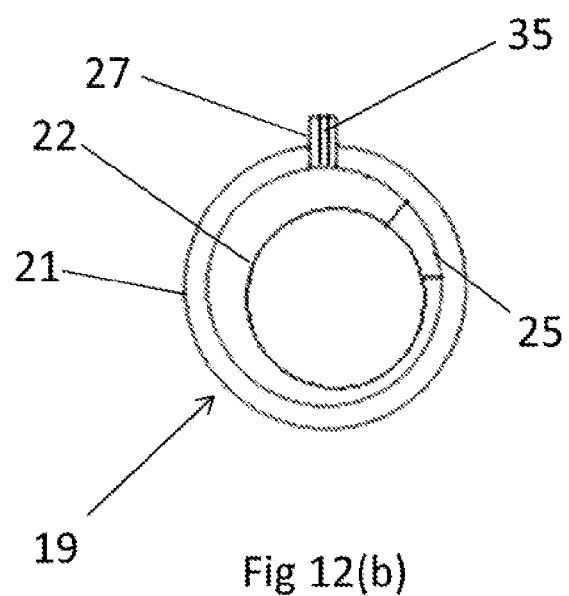

A ratchet device may be incorporated into the rims of the location ring 20 and the adjuster ring 19 to facilitate the making and retention of an adjustment. In one embodiment the ratchet device comprises a ridged section 33 on the location ring 20 and the lever 27 with a ridged section 35 on the adjuster ring 19. During installation an assembler may place an adequate force upon the lever 27 causing rotation of the adjustment ring 19 relative to the location ring 20. The ridged section 33 of the location ring 20 and the ridged section 35 of the lever 27 are engaged, therefore when the assembler stops applying the rotational force to the lever 27, the adjustment ring 19 and the location ring 20 are held in place due to the mechanical engagement of the ridges. The ridged section 33 of the location ring 20 and the ridged section 35 of the lever 27 are shown in FIGS. 12(*a*) and (*b*).

The adjustment rings 19,20 have been described for use in combination with the carrier part/reaction part, the bearing assembly could be directly mounted to the adjustment rings 19,20 and an alternative means of allowing some radial movement may be provided.

FIGS. 13 (*a*) to (*d*) shows some possible springs 17 for use in any embodiment of the invention.

In FIG. 13(*a*) the spring 17 is two flat pieces 29 (preferably steel, more preferably spring grade steel). FIG. 13(*b*) shows a U-shaped spring 30, this can be formed by bending a flat piece of metal, or attaching two flat pieces 29 as shown in FIG. 13(*a*) to a third flat piece of spring.

The spring 17 may be attached or formed as part of the bearing carrier 13 on moulding. This is shown in FIGS. 5 and 8. However alternatively, the spring 17 may be attached to the reaction part 18 so that it engages the bearing carrier 13. The springs may also be attached to the bearing carrier 16 and reaction part 18 by overmoulding the parts 16,18 onto the leaf springs 17.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A gearbox for use in an electric power assisted steering system in which a motor is connected to a portion of a steering mechanism through the gearbox, the gearbox comprising a housing, a worm gear carried by a worm shaft and a gear wheel carried by an output shaft, the worm shaft being supported relative to the housing by a tail bearing assembly, in which the tail bearing assembly is located relative to the housing by a bearing carrier, the bearing carrier comprising a bearing carrier part which is fixed to the tail bearing assembly and a reaction part which is fixed to the housing, the bearing carrier part being connected to the reaction part by at least two connecting elements, the two connecting elements being spaced apart so that the two connecting elements act with the bearing carrier part and the reaction part to form a parallelogram linkage that enables the bearing carrier to be relatively free to move relative to the reaction part in one direction, the bearing carrier also being relatively restrained from movement in two directions orthogonal to the one direction by the parallelogram linkage, wherein each of the two connecting elements comprises a leaf spring.

2. The gearbox of claim 1, wherein each of the bearing carrier part and reaction part is generally annular, having an inner diameter and an outer diameter, the bearing carrier and reaction parts being offset along a common axis by a distance dependent on the length of the two leaf springs.

3. The gearbox of claim 1, wherein the reaction part is connected to the gearbox by locating the reaction part within a bore in the housing.

4. The gearbox of claim 1, wherein the two connecting elements are formed from a spring grade steel.

5. The gearbox of claim 1, wherein the two connecting elements are attached to the bearing carrier part and/or to the reaction part by a process of over-moulding the bearing carrier and reaction parts onto the two connecting elements.

6. The gearbox of claim 1, wherein the reaction part is mounted to the housing via a pair of adjustment rings which provide adjustment of an outward travel of the worm shaft relative to an axis of the gear wheel.

7. The gearbox of claim 6, wherein the adjustment rings comprise a location ring and an adjuster ring in which the location ring in use is located within a recess in the housing and is shaped so that the adjuster ring can be located in at least two different angular orientations relative to the housing, the location ring having a bore defining an inner perimeter wall, an axis of the bore being located in a different plane relative to an axis of the recess in the housing, and in which the adjuster ring in use is located within the bore of the location ring and is shaped so that the adjuster ring can be oriented in the bore in at least two different positions, the adjuster ring also including a bore which has an axis that is parallel to the axis of the bore in the location ring but offset from the axis by an amount dependent on which of the at least two positions the adjuster ring is in, and in which the adjuster ring supports the reaction part of the bearing carrier.

8. The gearbox of claim 7, wherein the bore in the location ring is cylindrical, and/or the outer wall of the adjustment rings is also adjustable, enabling an infinite number of different angular positions and hence fine variation of the axis of the bearing carrier, to be achieved by rotation of the parts to the desired position during assembly.

9. The gearbox of claim 7, wherein in one position, an outer diameter of the location ring is concentric with a nominal worm shaft axis position, whereas the inner diameter of the location ring is offset by a small dimension in a very small but substantially horizontal displacement relative to the housing, whilst the outside diameter of the adjustment ring is similarly offset relative to an inside diameter thereof, the inside diameter is concentric with the nominal worm shaft axis when in one adjustment position.

10. The gearbox of claim 7, wherein when assembled with a relative angular orientation of the adjustment rings in a mid-adjustment position, the two adjustment rings have their outer and inner diameters concentric.

11. The gearbox of claim 7, wherein there is a clearance between the carrier part and the adjuster ring in all radial directions.

12. The gearbox of claim 7, wherein the adjuster ring has a lever which an assembler can place a force upon to cause rotation of the adjuster ring relative to the location ring.

13. The gearbox of claim 12, wherein a ratchet device is incorporated into an outer rim of the location ring and lever of the adjuster ring to facilitate the making and retention of any relative angular adjustment.

14. An electric power assisted steering system in which a motor is connected to a portion of a steering mechanism through a worm carried by a worm shaft and a gear wheel carried by an output shaft operatively coupled to the steering mechanism, the worm shaft being supported in a tail bearing assembly, in which the tail bearing assembly is located relative to a gearbox housing by a bearing carrier, the carrier comprising a bearing carrier part having a recess, the bearing carrier part being fixed to the bearing assembly and a reaction part which is mounted to the gearbox housing, the bearing carrier part being connected to the reaction part by at least two leaf springs to locate the tail bearing assembly, the two leaf springs being spaced apart so that the two leaf springs act as a parallelogram linkage to enable the bearing carrier to be relatively free to move relative to the reaction part in one direction and to also enable the bearing carrier to be relatively restrained from movement in two directions orthogonal to the one direction.

15. The electric power assisted steering system of claim 14, wherein the reaction part is mounted to the gearbox housing via a pair of adjustment rings which provide adjustment of the outward travel of the worm shaft relative to an axis of the gear wheel.

16. The electric power assisted steering system of claim 15, wherein the adjustment rings comprise a location ring and an adjuster ring in which the location ring in use is located within a recess in the gearbox housing and is shaped so that the location ring can be located in at least two different angular orientations relative to the gearbox housing, the location ring having a bore defining an inner perimeter wall, an axis of the bore being located in a different plane dependent on which of the at least two different angular orientation the location ring is in relative to the gearbox housing, and in which the adjuster ring in use is located within the bore of the location ring and is shaped so that the adjuster ring can be oriented in the bore in at least two different positions, the adjuster ring also including a bore which has an axis that is parallel to the axis of the bore in the location ring but offset from the axis by an amount dependent on which of the at least two different positions the adjuster ring is in, and in which the adjuster ring supports the reaction part of the bearing carrier.

\* \* \* \* \*